United States Patent
Cheng et al.

(10) Patent No.: US 11,488,793 B2
(45) Date of Patent: Nov. 1, 2022

(54) CIRCUIT STRUCTURE, BACKLIGHT MODULE AND LIGHT-EMITTING KEY DEVICE USING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ching-Lung Cheng, Taipei (TW); Chin-Chia Hsu, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 133 days.

(21) Appl. No.: 16/904,271

(22) Filed: Jun. 17, 2020

(65) Prior Publication Data

US 2020/0402748 A1     Dec. 24, 2020

Related U.S. Application Data

(60) Provisional application No. 62/902,988, filed on Sep. 20, 2019, provisional application No. 62/863,251, filed on Jun. 18, 2019.

(51) Int. Cl.
*G02B 6/00* (2006.01)
*H01H 13/83* (2006.01)
*F21V 8/00* (2006.01)

(52) U.S. Cl.
CPC ............. *H01H 13/83* (2013.01); *G02B 6/005* (2013.01); *G02B 6/0088* (2013.01); *H01H 2219/06* (2013.01); *H01H 2219/0622* (2013.01)

(58) Field of Classification Search
CPC .... G02B 6/0055; G02B 6/005; G02B 6/0088; H01H 13/83; H01H 2219/06; H01H 2219/0622
See application file for complete search history.

(56) References Cited

U.S. PATENT DOCUMENTS

2019/0027326 A1*   1/2019   Tsai ..................... H03K 17/98

FOREIGN PATENT DOCUMENTS

| CN | 101523261 A | 9/2009 | |
| CN | 103578831 A | * 2/2014 | ............. H01H 13/83 |
| CN | 106200113 A | 12/2016 | |
| CN | 107731606 A | 2/2018 | |

OTHER PUBLICATIONS

Chinese Office Action corresponding to Application No. 202010552022.4 and dated Sep. 5, 2022, 9 pages.

* cited by examiner

*Primary Examiner* — Towfiq Elahi
(74) *Attorney, Agent, or Firm* — Innovation Counsel LLP

(57) ABSTRACT

A circuit structure includes a light-transmissive insulation layer, a patterned conductive layer and an electronic component. The patterned conductive layer is disposed on the light-transmissive insulation layer. The electronic component is disposed on the patterned conductive layer and electrically connected to the patterned conductive layer.

11 Claims, 12 Drawing Sheets

CIRCUIT STRUCTURE, BACKLIGHT MODULE AND LIGHT-EMITTING KEY DEVICE USING THE SAME

This application claims the benefit of U.S. Provisional application Ser. No. 62/863,251, filed Jun. 18, 2019, the disclosure of which is incorporated by reference herein in its entirety, and claims the benefit of U.S. Provisional application Ser. No. 62/902,988, filed Sep. 20, 2019, the disclosure of which is incorporated by reference herein in its entirety.

FIELD OF THE INVENTION

The invention relates to a structure, a backlight module and a light-emitting key device using the same, and more particularly to a circuit structure, a backlight module and a light-emitting key device using the same.

BACKGROUND OF THE INVENTION

The conventional light-emitting keyboard includes several light-emitting elements and a light guide plate, and the light-emitting elements emit light into the light guide plate. Normally, light-emitting surface of the light-emitting element faces side of the light guide plate to provide side-light to the light guide plate. These light-emitting elements are concentratedly disposed adjacent to the side of the light guide plate, so that the keys closer to the light-emitting element get brighter brightness, and the keys farther from the light-emitting element get darker brightness. Therefore, the industry believes that it is necessary to study a new backlight module to improve the aforementioned conventional problems.

SUMMARY OF THE INVENTION

The present invention is to provide a circuit structure, a backlight module and a light-emitting key device using the same capable of improving the problems of the prior art.

In one embodiment of the invention, a circuit structure includes a light-transmissive insulation layer, a patterned conductive layer and an electronic component. The patterned conductive layer is disposed on the light-transmissive insulation layer. The electronic component is disposed on the patterned conductive layer and electrically connected to the patterned conductive layer.

In another embodiment of the invention, a backlight module includes a light guide plate, a circuit structure and a protection sheet. The circuit structure includes a light-transmissive insulation layer, a patterned conductive layer and an electronic component. The patterned conductive layer is disposed on the light-transmissive insulation layer. The electronic component is disposed on the patterned conductive layer and electrically connected to the patterned conductive layer. The electronic component is a light-emitting component. Wherein the circuit structure is disposed on one of the light-exit surface and the opposite surface, and the protection sheet is disposed on another of the light-exit surface and the opposite surface.

In another embodiment of the invention, a light-emitting key device includes a backlight module, a keycap and a lifting mechanism. The backlight module includes a light guide plate, a circuit structure and a protection sheet. The circuit structure includes a light-transmissive insulation layer, a patterned conductive layer and an electronic component. The patterned conductive layer is disposed on the light-transmissive insulation layer. The electronic component is disposed on the patterned conductive layer and electrically connected to the patterned conductive layer. The electronic component is a light-emitting component. Wherein the circuit structure is disposed on one of the light-exit surface and the opposite surface, and the protection sheet is disposed on another of the light-exit surface and the opposite surface. The lifting mechanism is disposed between the backlight module and the keycap.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

Figure 1A:
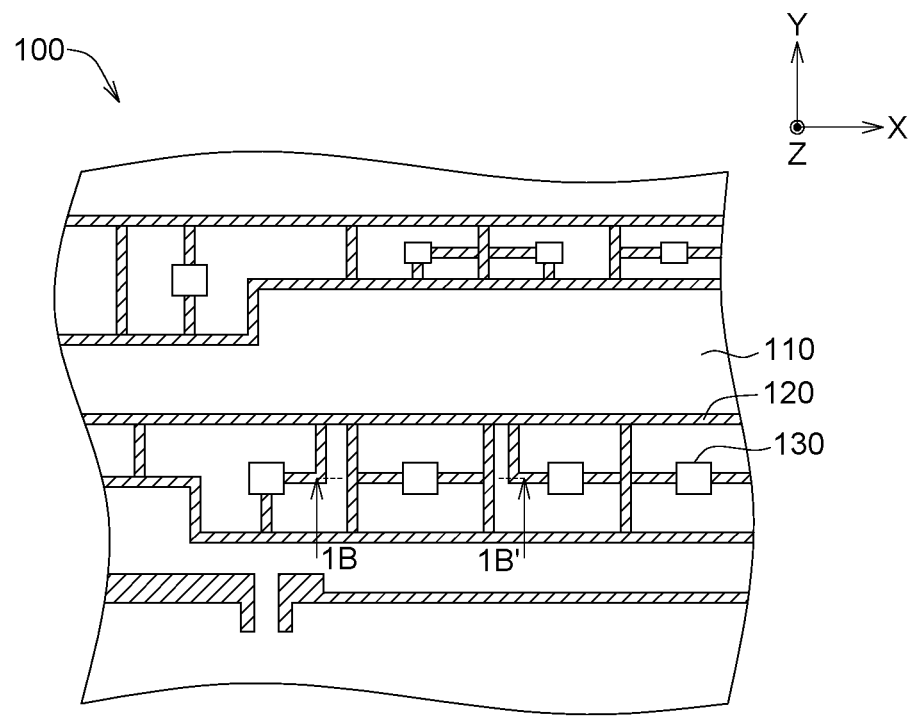
FIG. 1A illustrates a top view of the circuit structure 100 according to an embodiment of the present invention.
Figure 1B:
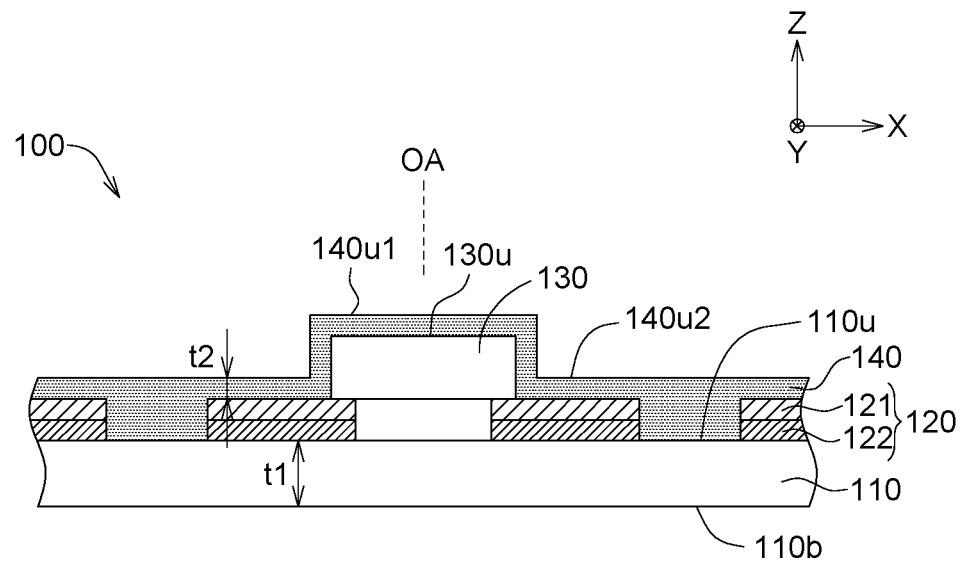
FIG. 1B illustrates a cross-sectional view of the circuit structure 100 of FIG. 1A along a direction 1B-1B'.

Referring to FIGS. 1A and 1B. FIG. 1A illustrates a top view of the circuit structure 100 according to an embodiment of the present invention, and FIG. 1B illustrates a cross-sectional view of the circuit structure 100 of FIG. 1A along a direction 1B-1B'.

The circuit structure 100 includes a light-transmissive insulation layer 110, a patterned conductive layer 120, at least one electronic component 130, and a protection layer 140. The patterned conductive layer 120 is disposed on the light-transmissive insulation layer 110. The electronic component 130 is disposed on the patterned conductive layer 120 and electrically connected to the patterned conductive layer 120. Since the light-transmissive insulation layer 110 has light-transmissive property, the circuit structure 100 could be applied to optical products, such as a backlight module or a light-emitting key device.

In one embodiment, the entire light-transmissive insulation layer 110 has light-transmissive property, but the embodiment of the present invention is not limited thereto. In terms of materials, the light-transmissive insulation layer 110 could be made of a material including, for example, polymethylmethacrylate (PMMA), polyethylene terephthalate (PET), polypropylene (PP), or Cyclo Olefin Polymer (COP), polycarbonate (PC), polystyrene (PS), polymethyl methacrylate-styrene (MS), or other suitable materials, for example, flexible materials. In terms of size, thickness t1 of the light-transmissive insulation layer 110 ranges, for example, between 0.05 mm and 0.2 mm.

In addition, the light-transmissive insulation layer 110 has a first insulation surface 110u and a second insulation surface 110b opposite to the first insulation surfaces 110u. The illustrated Z direction is substantially perpendicular to the first insulation surface 110u of the light-transmissive insulation layer 110, and the XY plane is substantially parallel to the extension direction of the first insulation surface 110u of the light-transmissive insulation layer 110.

The patterned conductive layer 120 includes a first sub-conductive layer 121 and a second sub-conductive layer 122. The second sub-conductive layer 122 is formed between the first sub-conductive layer 121 and the light-transmissive insulation layer 110. In an embodiment, the second sub-conductive layer 122 and the first sub-conductive layer 121 at least partially overlap. For example, the second sub-conductive layer 122 and the first sub-conductive layer 121 completely overlap. The conductivity of the first sub-conductive layer 121 is higher than that of the second sub-conductive layer 122. As a result, it could increase conductivity of the overall patterned conductive layer 120. In terms of materials, the first sub-conductive layer 121 could be made of, for example, copper, gold, silver, or other materials with excellent conductivity, and the second sub-conductive layer 122 could be made of, for example, graphite, silver paste, or aluminum powder. In terms of manufacturing process, the patterned conductive layer 120 could be formed on the light-transmissive insulation layer 110 using semiconductor technologies, for example, electroless plating, printing, and lithography etching.

In the present embodiment, the electronic component 130 is, for example, a light-emitting element, which has a light-emitting surface 130u and an optical axis direction OA, and the optical axis direction OA is substantially perpendicular to the light-emitting surface 130u. In another embodiment, the electronic component 130 is not limited to the light-emitting component. The type or function of the electronic component 130 could depend on the application or function of the circuit structure, and is not limited in the embodiments of the present invention. As illustrated in FIG. 1B, the optical axis direction OA is, for example, perpendicular to the first insulation surface 110u, so that the electronic component 130 could provide a vertical-type light emission (for example, perpendicular to the first insulation surface 110u).

As illustrated in FIG. 1B, the protection layer 140 covers the electronic component 130 and the patterned conductive layer 120. The protection layer 140 has a first protection surface 140u1 and a second protection surface 140u2. The first protection surface 140u1 and the light-emitting surface 130u overlap along the optical axis direction OA of the electronic component 130 (in the figure, overlap up and down). The second protection surface 140u2 and the first protection surface 140u1 are staggered with each other along the extension direction of the first insulation surface 110u (in the figure, staggered left and right). In terms of size, the protection layer 140 has thickness t2 ranging, for example, between 0.025 mm and 0.05 mm. The protection layer 140 is, for example, a light-transmissive protection layer. In terms of material, the material of the protection layer 140 includes, for example, polyethylene terephthalate, polypropylene, polycarbonate, polystyrene, or other transparent insulation materials and has flexibility.

Figure 2:
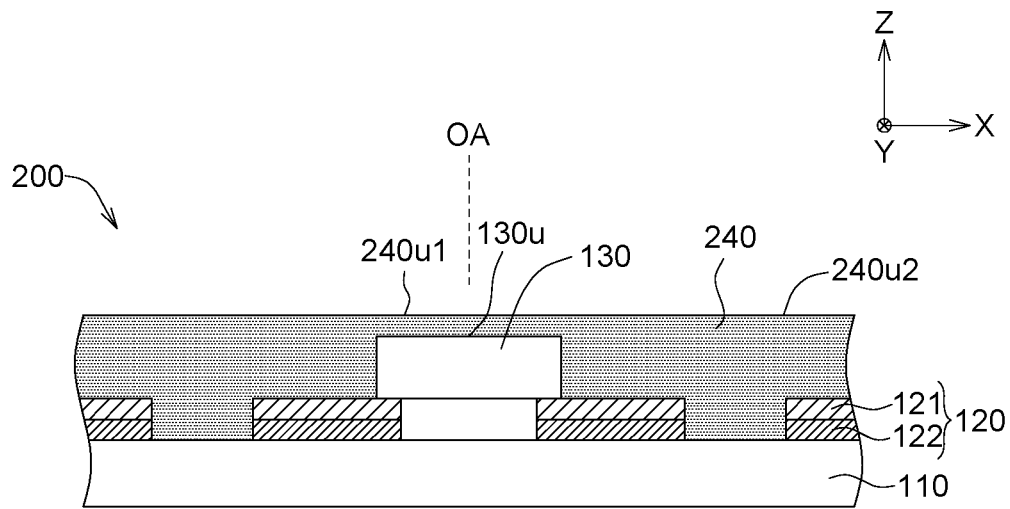
FIG. 2 illustrates a partial cross-sectional view of a circuit structure 200 according to another embodiment of the invention.

Referring to FIG. 2, a partial cross-sectional view of a circuit structure 200 according to another embodiment of the invention is illustrated. The circuit structure 200 includes the light-transmissive insulation layer 110, the patterned conductive layer 120, at least one electronic component 130, and a protection layer 240. The circuit structure 200 of the embodiment of the present invention has the same or similar technical features as the circuit structure 100, and the difference is that the structure of the protection layer 240 of the circuit structure 200 is different from the protection layer 140.

For example, the protection layer 240 has a first protection surface 240u1 and a second protection surface 240u2, wherein the first protection surface 240u1 and the light-emitting surface 130u of the electronic component 130 overlap along the optical axis direction OA of the electronic component 130, and the second protection surface 240u2 and the light-emitting surface 130u of the electronic component 130 do not overlap along the optical axis direction OA of the electronic component 130. In the present embodiment, the first protection surface 240u1 and the second protection surface 240u2 are substantially flush with each other along the extension direction of the first insulation surface 110u, for example, the first protection surface 240u1 and the second protection surface 240u2 are coplanar. Since the first protection surface 240u1 and the second protection surface 240u2 are flush with each other, upper surface of the circuit structure 200 (that is, the first protection surface 240u1 and the second protection surface 240u2) is a flat surface. In addition, the material and/or size of the protection layer 240 is similar to or the same as the material and/or size of the protection layer 140, which will not be repeated here. In another embodiment, the material of the protection layer 240 could be transparent silicide, transparent colloidal material, or other light-transmissive materials.

Figure 3:
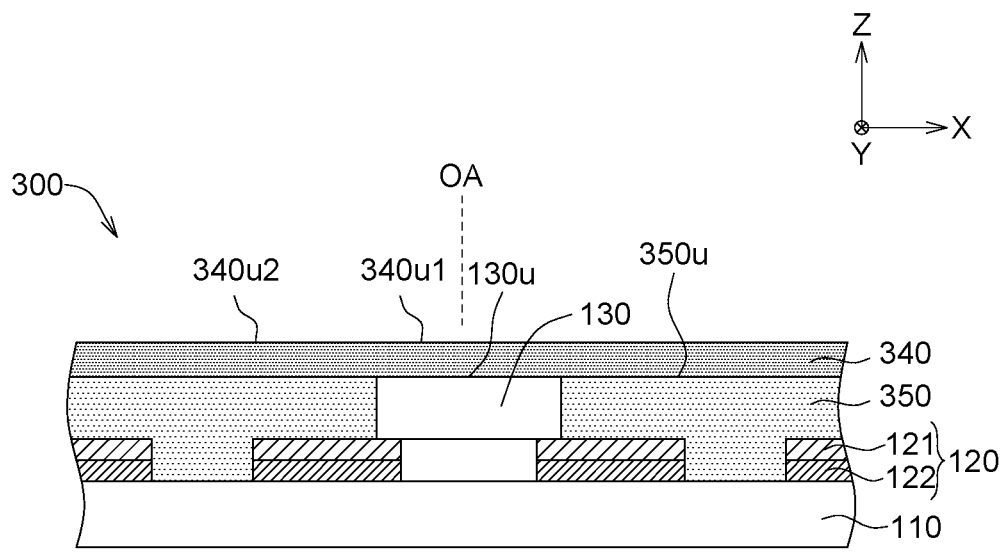
FIG. 3 illustrates a partial cross-sectional view of a circuit structure 300 according to another embodiment of the invention.

Referring to FIG. 3, a partial cross-sectional view of a circuit structure 300 according to another embodiment of the invention is illustrated. The circuit structure 300 includes the light-transmissive insulation layer 110, the patterned conductive layer 120, at least one electronic component 130, a protection layer 340 and a pad layer 350. The circuit structure 300 of the embodiment of the present invention has the same or similar technical features as the circuit structure 200, and the difference is that the circuit structure 300 further includes the pad layer 350.

For example, the pad layer 350 is disposed between the protection layer 340 and the patterned conductive layer 120, and the protection layer 340 could be elevated so that the upper surface of the circuit structure 200 (for example, the first protection surface 340$u$1 and the second protection surface 340$u$2 of the protection layer 340) is a flat surface. The pad layer 350 has a pad surface 350$u$, and the light-emitting surface 130$u$ of the electronic component 130 is substantially flush with the pad surface 350$u$ of the pad layer 350, for example, the light-emitting surface 130$u$ and the pad surface 350$u$ are coplanar. Alternatively, the light-emitting surface 130$u$ of the electronic component 130 and the pad surface 350$u$ of the pad layer 350 could be staggered with each other along the optical axis direction OA (in the figure, staggered up and down). In addition, the material and/or size of the protection layer 340 is similar to or the same as the material and/or size of the protection layer 140, which will not be repeated here. In an embodiment, the material and/or size of the pad layer 350 could be the same as or similar to the material and/or size of the protection layer 140, and details are not described herein.

Figure 4:
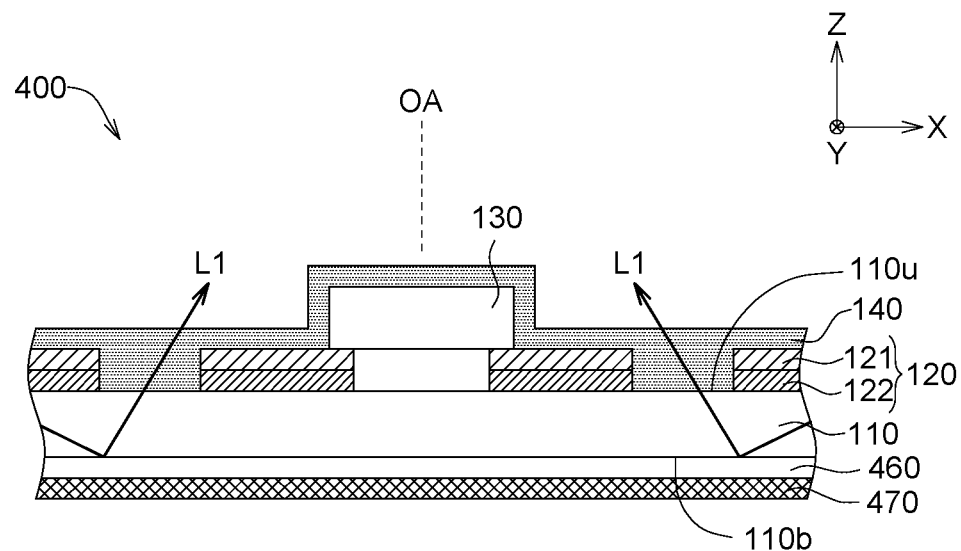
FIG. 4 illustrates a partial cross-sectional view of a circuit structure 400 according to another embodiment of the invention.

Referring to FIG. 4, a partial cross-sectional view of a circuit structure 400 according to another embodiment of the invention is illustrated. The circuit structure 400 includes the light-transmissive insulation layer 110, the patterned conductive layer 120, at least one electronic component 130, the protection layer 140, a reflective layer 460 and a light-shielding layer 470. The circuit structure 400 of the embodiment of the present invention has the same or similar technical features as the circuit structure 100, and the difference is that the circuit structure 400 further includes the reflective layer 460 and the light-shielding layer 470.

For example, the light-transmissive insulation layer 110 has the first insulation surface 110$u$ and the second insulation surface 110$b$ opposite to the first insulation surface 110$u$, the patterned conductive layer 120 is formed on the first insulation surface 110$u$, and the reflective layer 460 is formed on the second insulation surface 110$b$. The reflective layer 460 could reflect the light L1 to be incident to the reflective layer 460 back into the light-transmissive insulation layer 110 to reduce the amount of light leakage. The light-shielding layer 470 covers the reflective layer 460, and configured to absorb a part (if any) of the light L1 transmitted through the reflective layer 460 to further reduce the amount of light leakage. The reflective layer 460 covers at least one portion of the second insulation surface 110$b$, and the light-shielding layer 470 covers at least one portion of the reflective layer 460. In the present embodiment, the reflective layer 460 covers, for example, the entire second insulation surface 110$b$, and the light-shielding layer 470 covers, for example, the entire reflective layer 460, to minimize the amount of light leakage. In terms of material, the reflective layer 460 is, for example, white ink, and the light-shielding layer 470 is, for example, black ink.

In another embodiment, the reflective layer 460 and the light-shielding layer 470 could be disposed on opposite two sides of the light-transmissive insulation layer 110 respectively. For example, the reflective layer 460 is disposed on the first insulation surface 110$u$ of the light-transmissive insulation layer 110, and the light-shielding layer 470 is disposed on the second insulation surface 110$b$ of the light-transmissive insulation layer 110.

Figure 5:
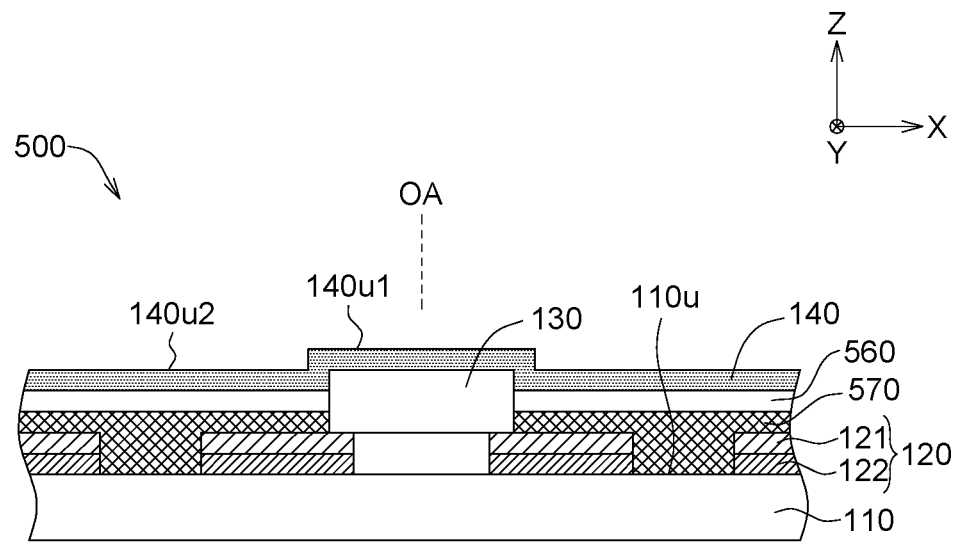
FIG. 5 illustrates a partial cross-sectional view of a circuit structure 500 according to another embodiment of the invention.

Referring to FIG. 5, a partial cross-sectional view of a circuit structure 500 according to another embodiment of the invention is illustrated. The circuit structure 500 includes the light-transmissive insulation layer 110, the patterned conductive layer 120, at least one electronic component 130, the protection layer 140, a reflective layer 560 and a light-shielding layer 570. The circuit structure 500 of the embodiment of the present invention has the same or similar technical features as the circuit structure 400, and the difference is that the formation positions of the reflective layer 560 and the light-shielding layer 570 of the circuit structure 500 are different from that of the reflective layer 460 and the light-shielding layer 470 of the circuit structure 400. For example, the light-shielding layer 570 of the circuit structure 500 covers the patterned conductive layer 120, and the reflective layer 560 covers the light-shielding layer 470.

The light-shielding layer 570 is, for example, a patterned light-shielding layer, and the reflective layer 560 is, for example, a patterned reflective layer. For example, the light-shielding layer 570 covers the portion that is outside the electronic component 130, for example, covers the first insulation surface 110$u$ of the light-transmissive insulation layer 110 and the patterned conductive layer 120 that do not overlap with the electronic component 130. The reflective layer 560 covers at least one portion of the light-shielding layer 570, for example, covers the entire light-shielding layer 570, so as to reduce the amount of light leakage as much as possible. In addition, as illustrated in FIG. 5, the protection layer 140 covers the electronic component 130 and the reflective layer 560. In the present embodiment, the first protection surface 140$u$1 and the second protection surface 140$u$2 of the protection layer 140 are staggered by a distance along the optical axis direction OA of the electronic component 130. However, in another embodiment, the first protection surface 140$u$1 and the second protection surface 140$u$2 could be substantially flush with each other along the extension direction of the surface 110$u$ of the first insulation surface 110$u$, for example, the first protection surface 140$u$1 and the second protection surface 140$u$2 are coplanar.

In addition, in terms of material, the reflective layer 560 is, for example, white ink, and the light-shielding layer 570 is, for example, black ink.

Figure 6:
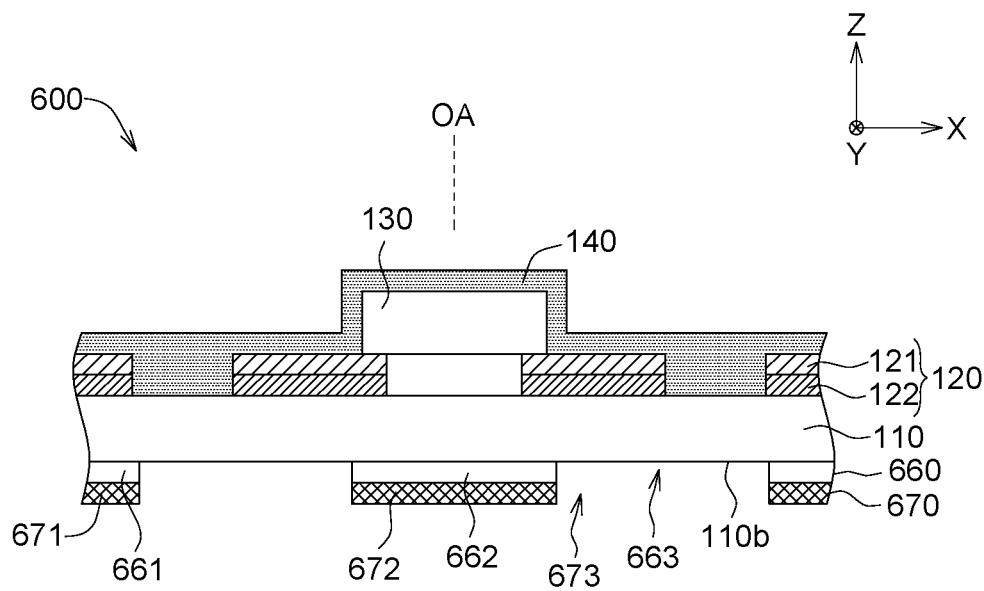
FIG. 6 illustrates a partial cross-sectional view of a circuit structure 600 according to another embodiment of the invention.

Referring to FIG. 6, a partial cross-sectional view of a circuit structure 600 according to another embodiment of the invention is illustrated. The circuit structure 600 includes the light-transmissive insulation layer 110, the patterned conductive layer 120, at least one electronic component 130, the protection layer 140, a reflective layer 660 and a light-shielding layer 670. The circuit structure 600 of the embodiment of the present invention has the same or similar technical features as the circuit structure 400, and difference is that the structure of the reflective layer 660 and the light-shielding layer 670 of the circuit structure 600 are different from that of the reflective layer 460 and the light-shielding layer 470 of the circuit structure 400.

For example, as illustrated in FIG. 6, the reflective layer 660 includes at least one first reflective portion 661, at least one second reflective portion 662 and at least one first light-transmissive region 663, wherein the first reflective portion 661 surrounds (or has) at least one first light-transmissive region 663. Each second reflection portion 662 is located in the corresponding first light-transmissive region 663. In addition, the position of the second reflective portion 662 corresponds to the electronic component 130. As a result, viewed from the direction of the second reflective portion 662 toward the electronic component 130 (for example, in +Z direction), the position of the second reflective portion 662 corresponds to the electronic component 130 to shield the electronic component 130 and prevent the electronic component 130 from being exposed (or being appeared) form the second insulation surface 110b of the light-transmissive insulation layer 110. In addition, in terms of material, the reflective layer 660 is, for example, white ink.

Similarly, the light-shielding layer 670 includes a first light-shielding portion 671, a second light-shielding portion 672, and at least one second light-transmissive region 673, wherein the first light-shielding portion 671 surrounds (or has) at least one second light-transmissive region 673. The second light-transmissive region 673 overlaps the first light-transmissive region 663 along the optical axis direction OA of the electronic component 130. Each second light-shielding portion 672 is located within the corresponding second light-transmissive region 673, and the position of the second light-shielding portion 672 corresponds to the electronic component 130. In the present embodiment, the second light-shielding portion 672 projects onto projection area of the electronic component 130 (for example, in +Z direction) to cover the entire electronic component 130 to completely shield the electronic component 130. In addition, in terms of material, the light-shielding layer 667 is, for example, black ink.

In addition, in terms of material, the reflective layer 660 is, for example, white ink, and the light-shielding layer 670 is, for example, black ink.

Figure 7:
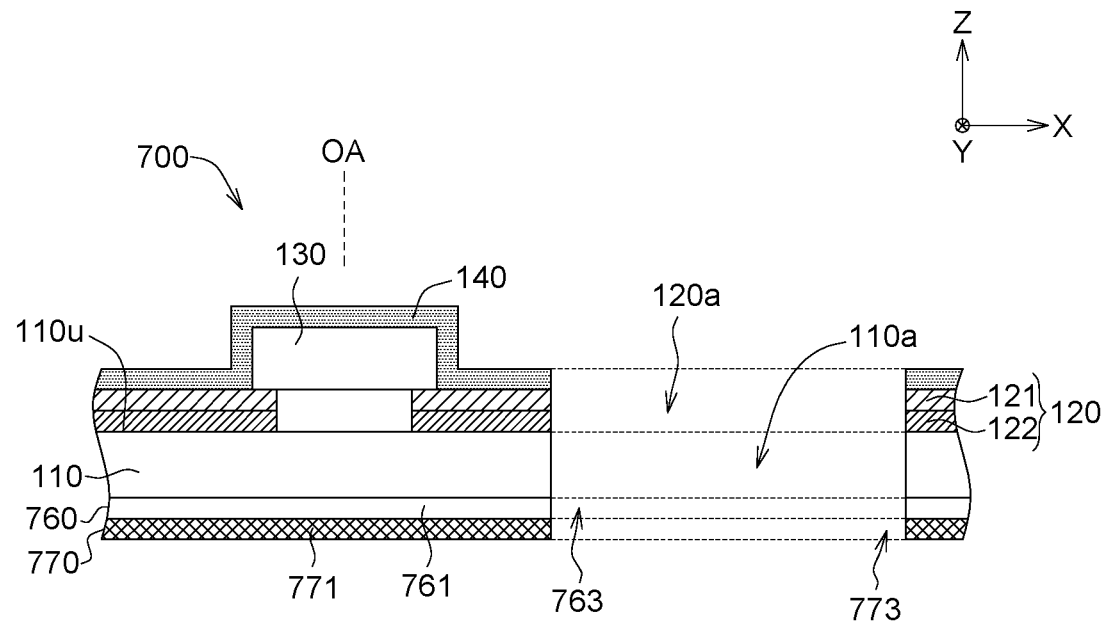
FIG. 7 illustrates a partial cross-sectional view of a circuit structure 700 according to another embodiment of the invention.

Referring to FIG. 7, a partial cross-sectional view of a circuit structure 700 according to another embodiment of the invention is illustrated. The circuit structure 700 includes the light-transmissive insulation layer 110, the patterned conductive layer 120, at least one electronic component 130, the protection layer 140, a reflective layer 760 and a light-shielding layer 770. The circuit structure 700 of the embodiment of the present invention has the same or similar technical features as the circuit structure 600, and difference is that the structures of the reflective layer 760 and the light-shielding layer 770 of the circuit structure 700 are different from that of the reflective layer 660 and the light-shielding layer 670 of the circuit structure 600.

For example, as illustrated in FIG. 7, the reflective layer 760 includes a first reflective portion 761 and at least one first light-transmissive region 763, wherein the first reflective portion 761 surrounds (or has) at least one first light-transmissive region 763. In the present embodiment, the first light-transmissive region 763 and the electronic component 130 are staggered with each other along the extension direction of the first insulation surface 110u. The position of the electronic component 130 corresponds to the first reflective portion 761. Viewed from the direction of the first reflective portion 761 toward the electronic component 130 (for example, −Z direction), the position of the first reflective portion 761 corresponds to the electronic component 130 to shield the electronic component 130 for preventing the electronic component 130 from being exposed (or being appeared) form the first insulation surface 110u of the light-transmissive insulation layer 110. In addition, in terms of material, the reflective layer 760 is, for example, white ink.

Similarly, the light-shielding layer 770 includes a first light-shielding portion 771 and at least one second light-transmissive region 773, wherein the first light-shielding portion 771 surrounds (or has) at least one second light-transmissive region 773. In the present embodiment, the second light-transmissive region 773 and the electronic component 130 are staggered with each other along the extension direction of the first insulation surface 110u. The second light-transmissive region 773 overlaps the first light-transmissive region 763 along the optical axis direction OA of the electronic component 130.

The position of the electronic component 130 corresponds to the first light-shielding portion 771. Viewed from the direction of the first light-shielding portion 771 toward the electronic component 130 (for example, in −Z direction), the position of the first light-shielding portion 771 corresponds to the electronic component 130 to shield the electronic component 130 for preventing the electronic component 130 from being exposed (or being appeared) form the reflective layer 760. In addition, in terms of material, the light-shielding layer 770 is, for example, black ink.

In addition, in the present embodiment, the entire light-transmissive insulation layer 110 has light-transmissive property, but the embodiment of the present invention is not limited thereto. In another embodiment, the light-transmissive insulation layer 110 could be a circuit board, for example, a printed circuit board (PCB) having a light-transmissive hole 110a (illustrated by a dotted line for clarity), and the light-transmissive hole 110a and the electronic component 130 are staggered with each other along the extension direction of the first insulation surface 110u. In addition, the patterned conductive layer 120 has a light-transmissive hole 120a (illustrated by a broken line for clarity), and the light-transmissive hole 120a overlaps with the light-transmissive hole 110a of the light-transmissive insulation layer 110 (for example, overlaps along the optical axis direction OA). In addition, the first light-transmissive region 763 (illustrated by a dotted line for clarity), the second light-transmissive region 773 (illustrated by a dotted line for clarity), the light-transmissive hole 110a and the light-transmissive hole 120a overlap (for example, overlap along the optical axis direction OA), so that the light emitted by the electronic component 130 could pass through the overlapped first light-transmissive region 763, the second light-transmissive region 773, the light-transmissive hole 110a and the light-transmissive hole 120a to exit the circuit structure 700.

In addition, in terms of material, the reflective layer 760 is, for example, white ink, and the light-shielding layer 770 is, for example, black ink.

Figure 8:
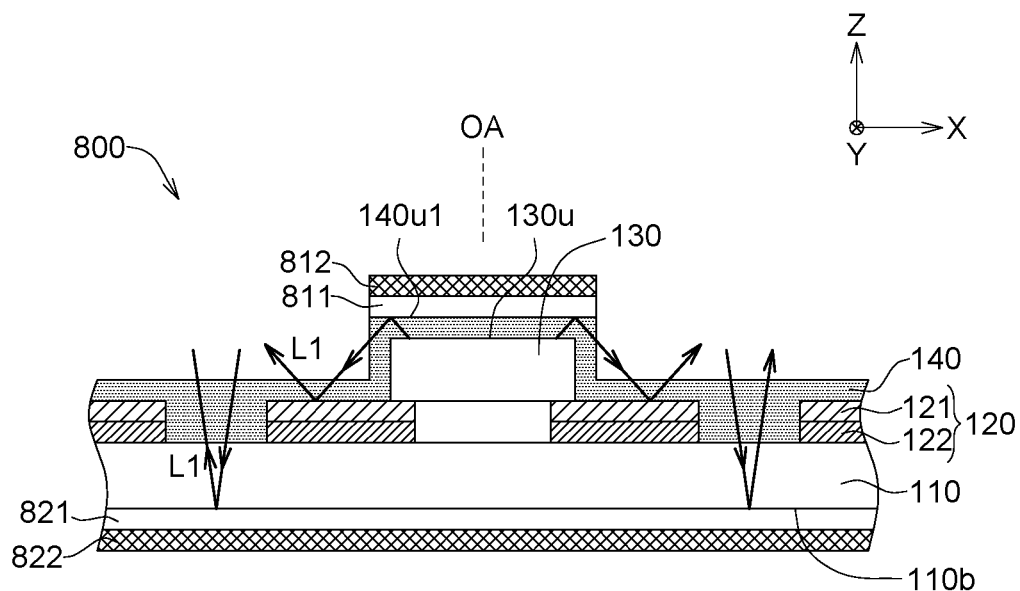
FIG. 8 illustrates a partial cross-sectional view of a circuit structure 800 according to another embodiment of the invention.

Referring to FIG. 8, a partial cross-sectional view of a circuit structure 800 according to another embodiment of the invention is illustrated. The circuit structure 800 includes the light-transmissive insulation layer 110, the patterned conductive layer 120, at least one electronic component 130, the protection layer 140, a first reflective layer 811, a first light-shielding layer 812, a second reflective layer 821 and a second light-shielding layer 822.

The circuit structure 800 of the embodiment of the present invention has the same or similar technical features as the circuit structure 100, and difference is that the circuit structure 800 further includes the first reflective layer 811, the first light-shielding layer 812, the second reflective layer 821 and the second light-shielding layer 822.

As illustrated in FIG. 8, the first reflective layer 811 is formed on the first protection surface 140u1 of the first protection layer 140. As a result, the light L1 emitted from the light-emitting surface 130*u* of the electronic component 130 to the first reflective layer 811 could be reflected from the first reflective layer 811 back to the light-transmissive insulation layer 110 to reduce the amount of light leakage. In addition, the second reflective layer 821 is formed on the second insulation surface 110*b* of the light-transmissive insulation layer 110. As a result, the light L1 incident to the second reflective layer 821 could be reflected back from the second reflective layer 821. Although not illustrated, the light L1 incident to the second reflective layer 821 is, for example, the light reflected from the structure located above the circuit structure 800.

In addition, as illustrated in FIG. 8, the first light-shielding layer 812 covers the first reflective layer 811 and the second light-shielding layer 822 covers the second reflective layer 821. As a result, a part (if any) of the light L1 transmitted through the reflective layer (for example, the first reflective layer 811 and/or the second reflective layer 821) could be absorbed to further reduce the amount of light leakage.

In another embodiment, the first reflective layer 811 and the first light-shielding layer 812 in FIG. 8 are disposed on two opposite sides of the protection layer 140. For example, the first reflective layer 811 is disposed between the light-emitting surface 130*u* of the electronic component 130 and the protection layer 140, and the first light-shielding layer 812 covers the first protection surface 140*u*1 of the first reflective layer 811. Alternatively, in another embodiment, the first light-shielding layer 812 could be disposed between the first reflective layer 811 and the protection layer 140. For example, the first reflective layer 811 covers the light-emitting surface 130*u* of the electronic component 130, the first light-shielding layer 812 covers the first reflective layer 811, and the protection layer 140 covers the first light-shielding layer 812 and the first reflective layer 811.

Figure 9:
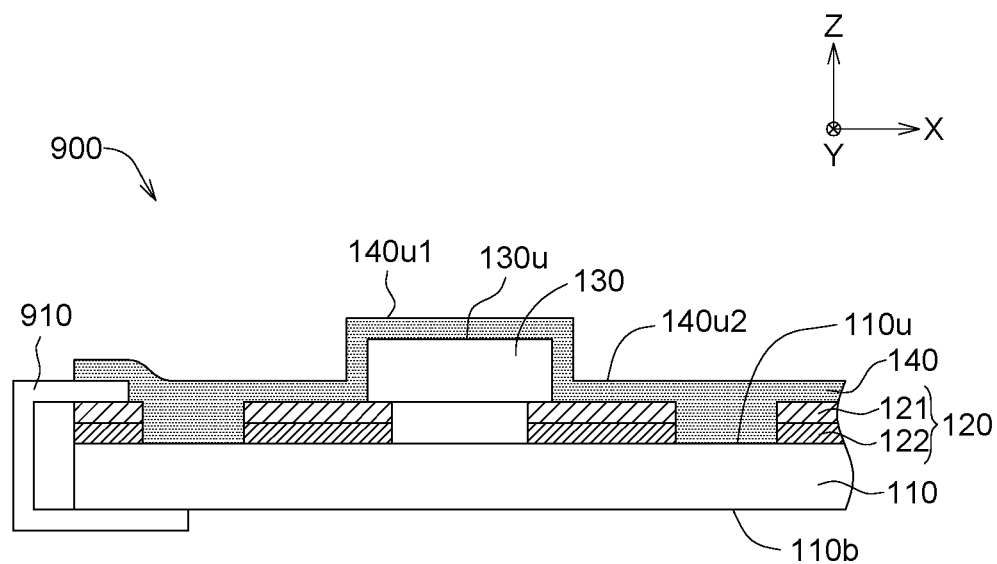
FIG. 9 illustrates a partial cross-sectional view of a circuit structure 900 according to another embodiment of the invention.

Referring to FIG. 9, a partial cross-sectional view of a circuit structure 900 according to another embodiment of the invention is illustrated. The circuit structure 900 includes the light-transmissive insulation layer 110, the patterned conductive layer 120, at least one electronic component 130, the protection layer 140 and a circuit board 910.

The circuit structure 900 of the embodiment of the present invention has the same or similar technical features as the circuit structure 100, and difference is that the circuit structure 900 further includes the circuit board 910.

In the present embodiment, the circuit board 910 is, for example, a flexible printed circuit board (FPCB). After the circuit board 910 is additionally completed, the circuit board 910 is disposed on the patterned conductive layer 120, for example, on the circuit board 910 is disposed on and electrically connected with the first sub-conductive layer 121 of the patterned conductive layer 120. In addition, the circuit board 910 could be folded back to the second insulation surface 110*b* of the light-transmissive insulation layer 110 to reduce the length of the circuit structure 900. The additionally connected circuit board 910 could stabilize current and impedance to stabilize the luminous efficiency of the electronic component 130.

In addition, the circuit board 910 could be connected with the patterned conductive layer 120 of any of the foregoing circuit structures 100 to 800 in the same manner, for example, the first sub-conductive layer 121 of the patterned conductive layer 120.

Figure 10A:
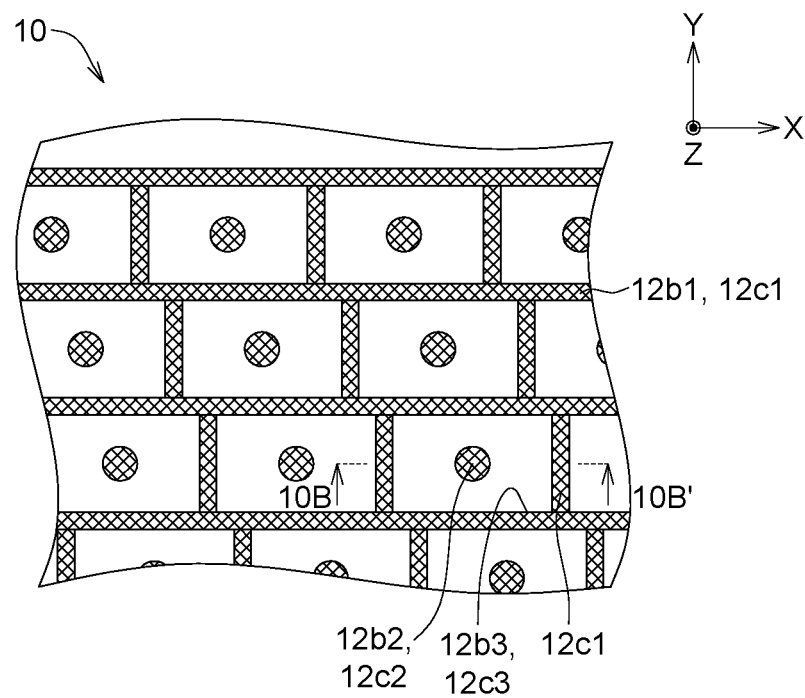
FIG. 10A illustrates a top view of a backlight module 10 according to an embodiment of the present invention.
Figure 10B:
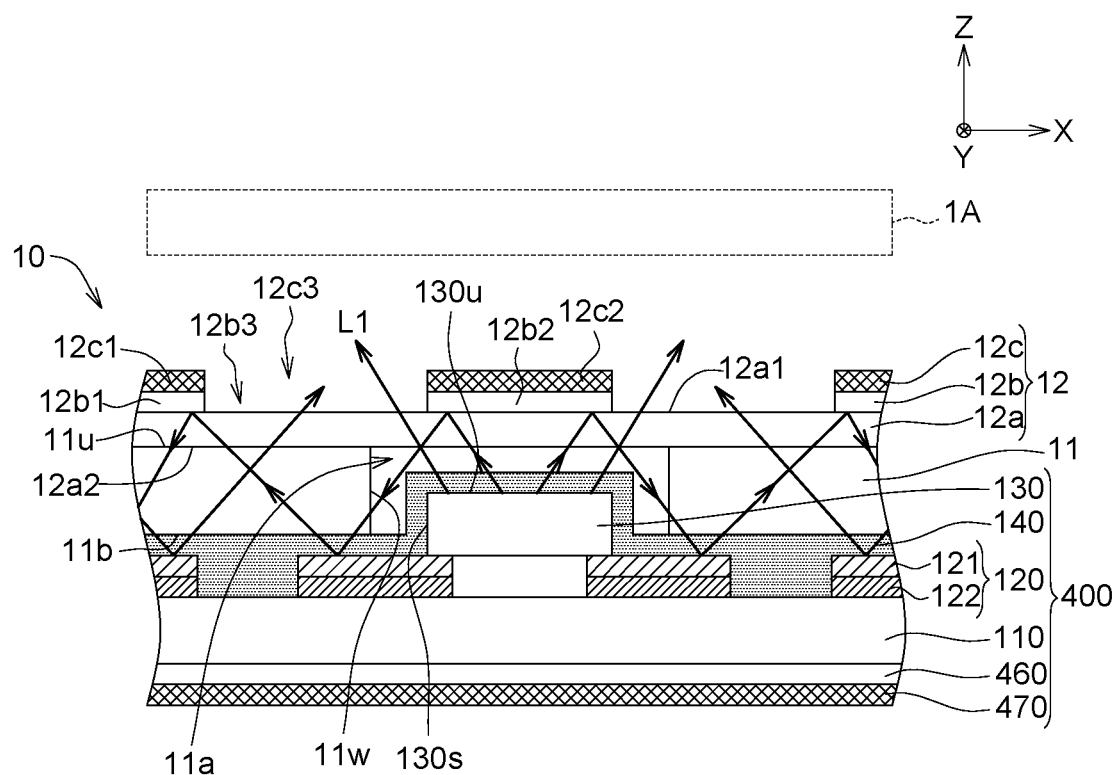
FIG. 10B illustrates a cross-sectional view of the backlight module 10 of FIG. 10A along a direction 10B-10B'.

Referring FIGS. 10A and 10B, FIG. 10A illustrates a top view of a backlight module 10 according to an embodiment of the present invention, and FIG. 10B illustrates a cross-sectional view of the backlight module 10 of FIG. 10A along a direction 10B-10B'. The backlight module 10 includes a light guide plate 11, a circuit structure 400 and a protection sheet 12. The light guide plate 11 has a light-exit surface 11*u* and an opposite surface 11*b* opposite to the light-exit surface 11*u*. The circuit structure 400 is disposed on one of the opposite surface 11*b* and the light-exit surface 11*u*, and the protection sheet 12 is disposed on another of the opposite surface 11*b* and the light-exit surface 11*u*. In the present embodiment, the circuit structure 400 is disposed on the opposite surface 11*b*, and the protection sheet 12 is disposed on the light-exit surface 11*u*.

The protection sheet 12 includes a light-transmissive insulation layer 12*a*, a reflective layer 12*b*, and a light-shielding layer 12*c*. The reflective layer 12*b* and the light-shielding layer 12*c* are arranged on the same side of the light-transmissive insulation layer 12*a*. For example, the light-transmissive insulation layer 12*a* has a first insulation surface 12*a*1 and a second insulation surface 12*a*2 opposite to the first insulation surface 12*a*1. The reflective layer 12*b* is formed on the first insulation surface 12*a*1 of the light-transmissive insulation layer 12*a*, and the light-shielding layer 12*c* covers the reflective layer 12*b*. As illustrated in FIG. 10B, the reflective layer 12*b* includes a first reflective portion 12*b*1, a second reflective portion 12*b*2 and at least one first light-transmissive region 12*b*3, wherein the first reflective portion 12*b*1 surrounds (or has) at least one first light-transmissive region 12*b*3. As illustrated in FIG. 10B, the position of the first light-transmissive region 12*b*3 corresponds to a keycap 1A (illustrated by a dotted line) of a light-emitting key device. In one embodiment, one first light-transmissive region 12*b*3 and one electronic component 130 could correspond to area of one keycap 1A. As a result, each keycap 1A could receive the light provided by at least one electronic component 130, so that the keycaps 1A of the light-emitting key device could emit light more uniformly and/or brighter.

As illustrated in FIG. 10B, each second reflective portion 12*b*2 is located within the corresponding first light-transmissive region 12*b*3. In addition, the position of the second reflective portion 12*b*2 corresponds to the electronic component 130. As a result, viewed from the direction of the second reflective portion 12*b*2 toward the electronic component 130 (for example, −Z direction), the position of the second reflective portion 12*b*2 corresponds to the electronic component 130 to shield the electronic component 130 for preventing the electronic component 130 from being exposed (or being appeared) from the first insulation surface 12*a*1 of the light-transmissive insulation layer 12*a*. In addition, in terms of material, the reflective layer 12*b* is, for example, white ink.

Similarly, the light-shielding layer 12*c* includes a first light-shielding portion 12*c*1, a second light-shielding portion 12*c*2, and at least one second light-transmissive region 12*c*3, wherein the first light-shielding portion 12*c*1 surrounds (or has) at least one second light-transmissive region 12*c*3. As illustrated in FIG. 10B, the position of the second light-transmissive region 12*c*3 corresponds to the keycap 1A of the light-emitting key device (illustrated by broken lines). Each second light-shielding portion 12*c*2 is located within the second light-transmissive region 12*c*3, and the position of the second light-shielding portion 12*c*2 corresponds to the electronic component 130. In the present embodiment, the second light-shielding portion 12*c*2 projects onto projection area of the electronic component 130 (for example, in −Z direction) to cover the entire electronic component 130 to completely shield the electronic component 130. In addition, in terms of material, the light-shielding layer 12*c* is, for example, black ink.

In addition, as illustrated in FIGS. 10A and 10B, areas of the first light-transmissive region 12b3 and the second light-transmissive region 12c3 could define a key arrangement area of a keyboard. For example, the area of the first light-transmissive region 12b3 and the area of the second light-transmissive region 12c3 correspond to the keycap 1A.

The light guide plate 11 has at least one opening 11a. The opening 11a could accommodate the electronic component 130 to prevent the electronic component 130 from interfering with the protection sheet 12 disposed above. As illustrated in FIG. 10B, the electronic component 130 is partially located in the opening 11a, wherein a lateral surface 130s of the electronic component 130 faces an inner side wall 11w of the opening 11a. As illustrated in FIG. 10B, part of the light L1 emitted from the electronic component 130 is emitted from the first insulation surface 12a1 of the light-transmissive insulation layer 12a, and another part of the light L1 could be incident to the light guide plate 11 from the inner side wall 11w of the opening 11a and repeatedly reflected within the light guide plate 11 until exiting from the corresponding first light-transmissive region 12b3 and the second light-transmissive region 12c3.

In another embodiment, the reflective layer 12b and the light-shielding layer 12c in FIG. 10B are respectively disposed on two opposite sides of the light-transmissive insulation layer 12a. For example, the reflective layer 12b is disposed on the second insulation surface 12a2 of the light-transmissive insulation layer 12a, and the light-shielding layer 12c is disposed on the first insulation surface 12a1 of the light-transmissive insulation layer 12a. Alternatively, in other embodiments, the reflective layer 12b and the light-shielding layer 12c could be disposed on the same side of the light-transmissive insulation layer 12a, for example, the light-shielding layer 12c could cover the second insulation surface 12a2 of the light-transmissive insulation layer 12a, and the reflective layer 12b could cover the light-shielding layer 12c.

In another embodiment, the circuit structure 400 of the backlight module 10 could be replaced by any of the circuit structures 100, 200, 300, 500, 600 and 700. When the circuit structure 400 of the backlight module 10 is replaced by the circuit structure 200 or 300, the light guide plate 11 of the backlight module 10 could omit the opening 11a, and the protection layer 240 of the circuit structure 200 or the protection layer 340 of the circuit structure 300 is disposed on the opposite surface 11b of the light guide plate 11. For example, the entire of the protection layer 240 or the entire of protection layer 340 of the circuit structure 200 is directly or indirectly attached to the opposite surface 11b of the light guide plate 11 of the backlight module 10, and the light-emitting surface 130u of the electronic component 130 faces the opposite surface 11b of the light guide plate 11.

Figure 11A:
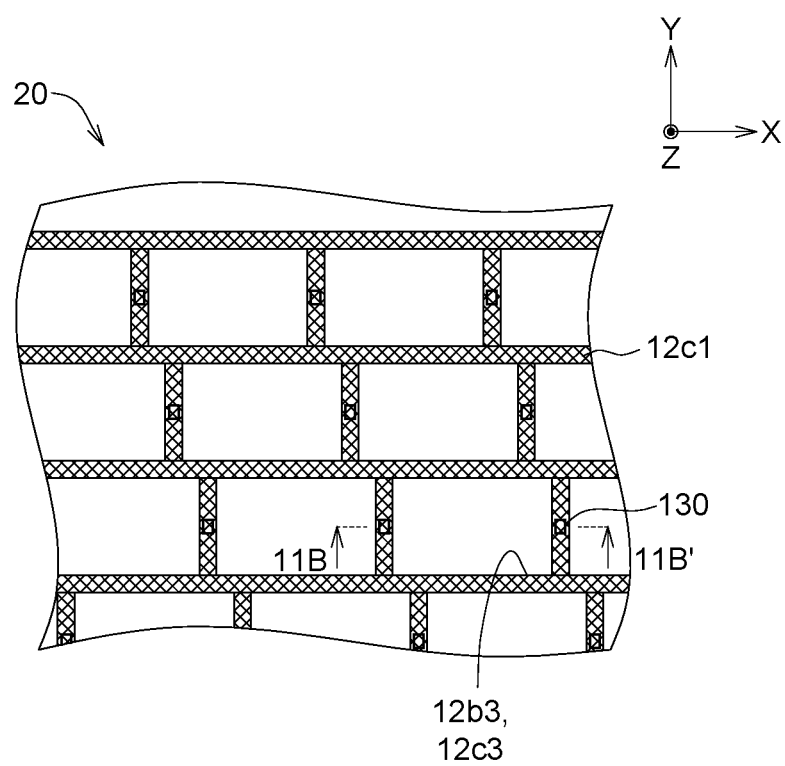
FIG. 11A illustrates a top view of a backlight module 20 according to another embodiment of the present invention.
Figure 11B:
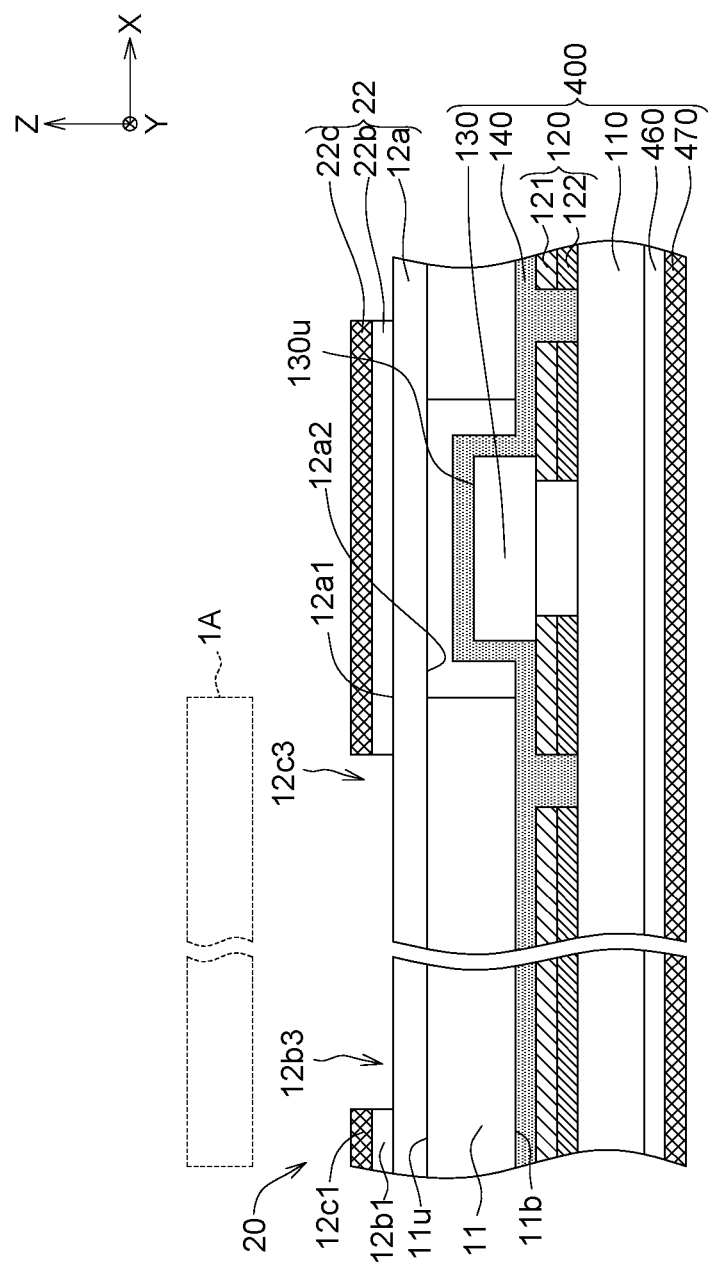
FIG. 11B illustrates a cross-sectional view of the backlight module 20 of FIG. 11A along a direction 11B-11B'.

Referring FIGS. 11A and 11B, FIG. 11A illustrates a top view of a backlight module 20 according to another embodiment of the present invention, and FIG. 11B illustrates a cross-sectional view of the backlight module 20 of FIG. 11A along a direction 11B-11B'. The backlight module 20 includes the light guide plate 11, the circuit structure 400 and a protection sheet 22. The light guide plate 11 has opposing the light-exit surface 11u and the opposite surface 11b opposite to the light-exit surface 11u. In the present embodiment, the circuit structure 400 is disposed on the opposite surface 11b of the light guide plate 11, and the protection sheet 12 is disposed on the light-exit surface 11u. The backlight module 20 has the same or similar technical features as the backlight module 10, the difference is that the electronic components 130 are arranged at different positions.

For example, the protection sheet 22 includes the light-transmissive insulation layer 12a, a reflective layer 22b and a light-shielding layer 22c, where the reflective layer 22b and the light-shielding layer 22c are disposed on the same side of the light-transmissive insulation layer 12a. For example, the reflective layer 22b is formed on the first insulation surface 12a1 of the light-transmissive insulation layer 12a, and the light-shielding layer 22c covers the reflective layer 22b. As illustrated in FIG. 11B, the reflective layer 22b includes the first reflective portion 12b1, and the first reflective portion 12b1 surrounds at least one first light-transmissive region 12b3. As illustrated in FIG. 11B, the position of the first light-transmissive region 12b3 corresponds to the keycap 1A of the light-emitting key device (illustrated by dotted lines). Compared with the aforementioned reflective layer 12b, the reflective layer 22b of the embodiment of the present invention could not include the second reflective portion 12b2. The position of the electronic component 130 corresponds to the first reflective portion 12b1. Viewed from the direction of the first reflective portion 12b1 toward the electronic component 130 (for example, in −Z direction), the position of the first reflective portion 12b1 corresponds to the electronic component 130 to shield the electronic component 130 for preventing the electronic component 130 from being exposed (or being appeared) form the first insulation surface 12a1 of the light-transmissive insulation layer 12a. In addition, in terms of material, the reflective layer 22b is, for example, white ink.

Similarly, the light-shielding layer 22c includes the first light-shielding portion 12c1, and the first light-shielding portion 12c1 surrounds at least one second light-transmissive region 12c3. As illustrated in FIG. 11B, the position of the second light-transmissive region 12c3 corresponds to the keycap 1A of the light-emitting key device (illustrated by broken line). Compared with the aforementioned light-shielding layer 12c, the light-shielding layer 22c of the embodiment of the present invention does not include the second light-shielding portion 12c2. The position of the electronic component 130 corresponds to the first light-shielding portion 12c1. Viewed from the direction of the first light-shielding portion 12c1 toward the electronic component 130 (for example, in −Z direction), the first light-shielding portion 12c1 could shield the electronic component 130 for preventing the electronic component 130 from being exposed (or being appeared) form the first insulation surface 12a1 of the light-transmissive insulation layer 12a. In addition, in terms of material, the light-shielding layer 22c is, for example, black ink.

In another embodiment, the circuit structure 400 of the backlight module 20 could be replaced by any of the circuit structures 100, 200, 300, 500, 600 and 700. When the circuit structure 400 of the backlight module 20 is replaced by the circuit structure 200 or 300, the light guide plate 11 of the backlight module 20 could omit the opening 11a and the protection layer 240 of the circuit structure 200 or the protection layer 340 of the circuit structure 300 is disposed in the opposite surface 11b of the light guide plate 11. For example, the entire protection layer 240 of the circuit structure 200 or the entire protection layer 340 of the circuit structure 300 is directly or indirectly attached to the opposite surface 11b of the light guide plate 11 of the backlight module 20, and the light-emitting surface 130*u* of the electronic component 130 faces the opposite surface 11*b* of the light guide plate 11.

Figure 12:
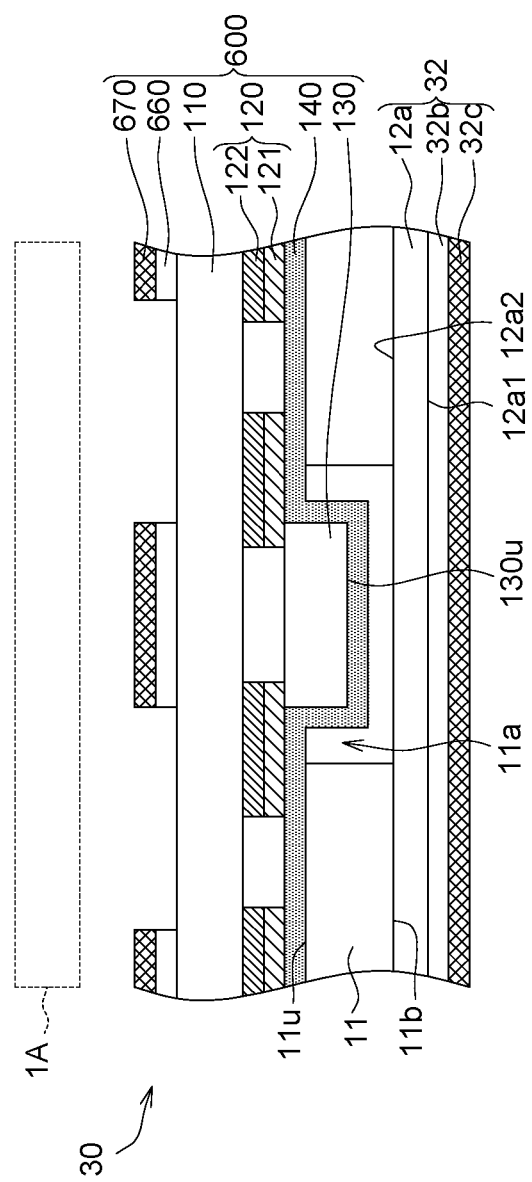
FIG. 12 illustrates a partial cross-sectional view of a backlight module 30 according to another embodiment of the present invention.

Referring to FIG. 12, a partial cross-sectional view of a backlight module 30 according to another embodiment of the present invention is illustrated. The backlight module 30 includes the light guide plate 11, the circuit structure 600 and a protection sheet 32. The light guide plate 11 has the light-exit surface 11*u* and the opposite surface 11*b* opposite to the light-exit surface 11*u*. The circuit structure 600 is disposed on one of the light-exit surface 11*u* and the opposite surface 11*b*, and the protection sheet 32 is disposed on another of the light-exit surface 11 *u* and the opposite surface 11*b*. In the present embodiment, the circuit structure 600 is disposed on the light-exit surface 11*u*, and the protection sheet 32 is disposed on the opposite surface 11*b*.

The protection sheet 32 includes the light-transmissive insulation layer 12*a*, a reflective layer 32*b* and a light-shielding layer 32*c*. The reflective layer 32*b* and the light-shielding layer 32*c* are disposed on the same side of the light-transmissive insulation layer 12*a*. For example, the reflective layer 32*b* is formed on the first insulation surface 12*a*1 of the light-transmissive insulation layer 12*a*, and the light-shielding layer 32*c* covers the reflective layer 32*b*. As illustrated in FIG. 12, the reflective layer 32*b* is not patterned reflective layer and is an intact layer structure covering at least a part of the first insulation surface 12*a*1. Similarly, the light-shielding layer 32*c* is not patterned reflective layer and is an intact layer structure covering at least a part of the reflective layer 32*b*. In addition, In the present embodiment, the light-emitting surface 130*u* of the electronic component 130 faces the protection sheet 32, for example, the light-emitting surface 130*u* faces the second insulation surface 12*a*2 of the protection sheet 32.

In another embodiment, the circuit structure 600 of the backlight module 30 could also be replaced by any one of the circuit structures 100 to 500 and 700. When the circuit structure 600 of the backlight module 30 is replaced by the circuit structure 200 or 300, the light guide plate 11 of the backlight module 30 could omit the opening 11*a*, and the protection layer 240 of the circuit structure 200 or the protection layer 340 of the circuit structure 300 could be disposed on the light-exit surface 11*u* of the light guide plate 11. For example, the entire protection layer 240 of the circuit structure 200 or the entire protection layer 340 of the circuit structure 300 could be directly or indirectly attached to the light-exit surface 11*u* of the light guide plate 11 of the backlight module 30, and the light-emitting surface 130*u* of the electronic component 130 faces the light-exit surface 11*u* of the light guide plate 11.

In another embodiment, the reflective layer 32*b* and the light-shielding layer 32*c* in FIG. 12 are respectively disposed on two opposite sides of the light-transmissive insulation layer 12*a*. For example, the reflective layer 32*b* is disposed on the second insulation surface 12*a*2 of the light-transmissive insulation layer 12*a*, and the light-shielding layer 32*c* is disposed on the first insulation surface 12*a*1 of the light-transmissive insulation layer 12*a*. Alternatively, the reflective layer 32*b* and the light-shielding layer 32*c* could be disposed on the same side of the light-transmissive insulation layer 12*a*. For example, the light-shielding layer 32*c* could cover the second insulation surface 12*a*2 of the light-transmissive insulation layer 12*a*, and the reflection layer 32*b* could cover the light-shielding layer 32*c*. Alternatively, the reflective layer 32*b* could cover the second insulation surface 12*a*2 of the light-transmissive insulation layer 12*a*, and the light-shielding layer 32*c* could cover the reflective layer 32*b*.

In another embodiment, the protection sheet 32 of the backlight module 30 could be replaced by a diffuser (diffusion sheet).

Figure 13:
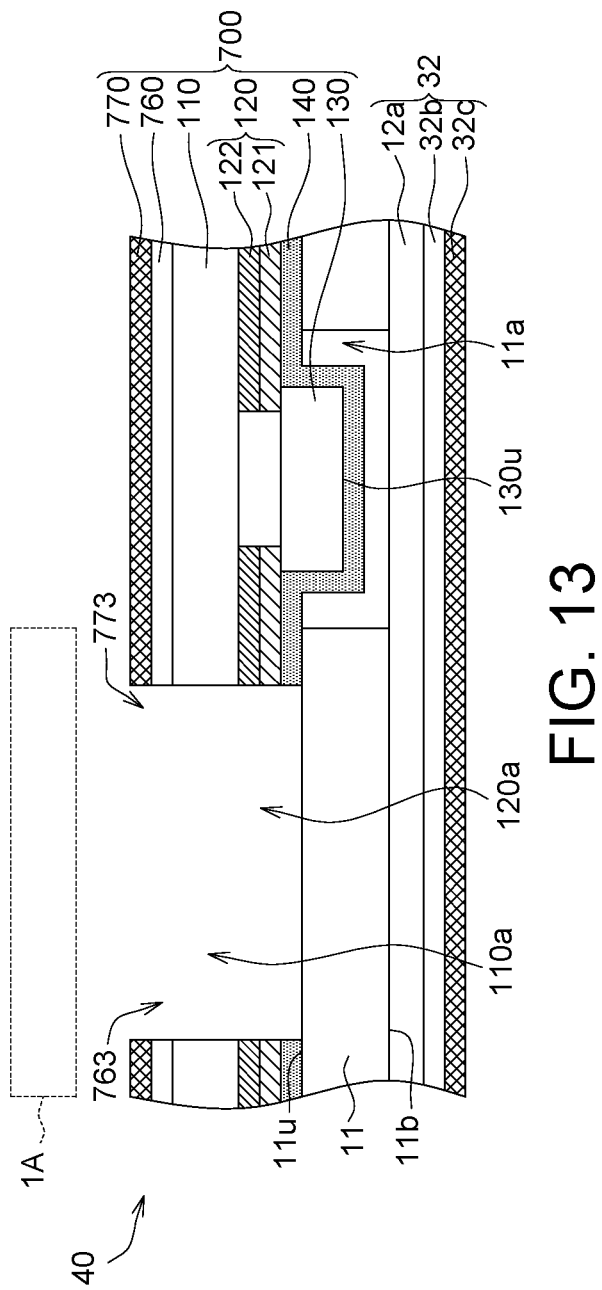
FIG. 13 illustrates a partial cross-sectional view of a backlight module 40 according to another embodiment of the present invention.

Referring to FIG. 13, a partial cross-sectional view of a backlight module 40 according to another embodiment of the present invention is illustrated. The backlight module 40 includes the light guide plate 11, the circuit structure 700 and the protection sheet 32. The light guide plate 11 has the light-exit surface 11*u* and the opposite surface 11*b* opposite to the light-exit surface 11*u*. The circuit structure 700 is disposed on one of the light-exit surface 11*u* and the opposite surface 11*b*, and the protection sheet 32 is disposed on another of the light-exit surface 11*u* and the opposite surface 11*b*. In the present embodiment, the circuit structure 700 is disposed on the light-exit surface 11*u*, and the protection sheet 32 is disposed on the opposite surface 11*b*.

In the present embodiment, as illustrated in FIG. 13, the position of the first light-transmissive region 763 of the reflective layer 760, the position of the second light-transmissive region 773 of the light-shielding layer 770, the position of the light-transmissive hole 110*a* of the light-transmissive insulating layer 110 and the position of the light-transmissive hole 120*a* of the patterned conductive layer 120 correspond to the keycap 1A (illustrated by broken lines) of the light-emitting key device, such that the light emitted by the electronic component 130 could be incident to the keycap 1A through these light-transmissive structures.

In another embodiment, the circuit structure 700 of the backlight module 40 could also be replaced by any one of the circuit structures 10 to 600. When the circuit structure 700 of the backlight module 40 is replaced by the circuit structure 200 or 300, the light guide plate 11 of the backlight module 30 could omit the opening 11*a* and the protection layer 240 of the circuit structure 200 or the protection layer 340 of the circuit structure 300 could be disposed on the light-exit surface 11*u* of the light guide plate 11. For example, the protection layer 240 of the circuit structure 200 or the protection layer 340 of the circuit structure 300 could be directly or indirectly attached to the light-exit surface 11*u* of the light guide plate 11 of the backlight module 30, and the light-emitting surface 130*u* of the electronic component 130 faces the light-exit surface 11*u* of the light guide plate 11.

In another embodiment, the protection sheet 32 of the backlight module 40 could be replaced the diffuser (diffusion sheet).

Figure 14:
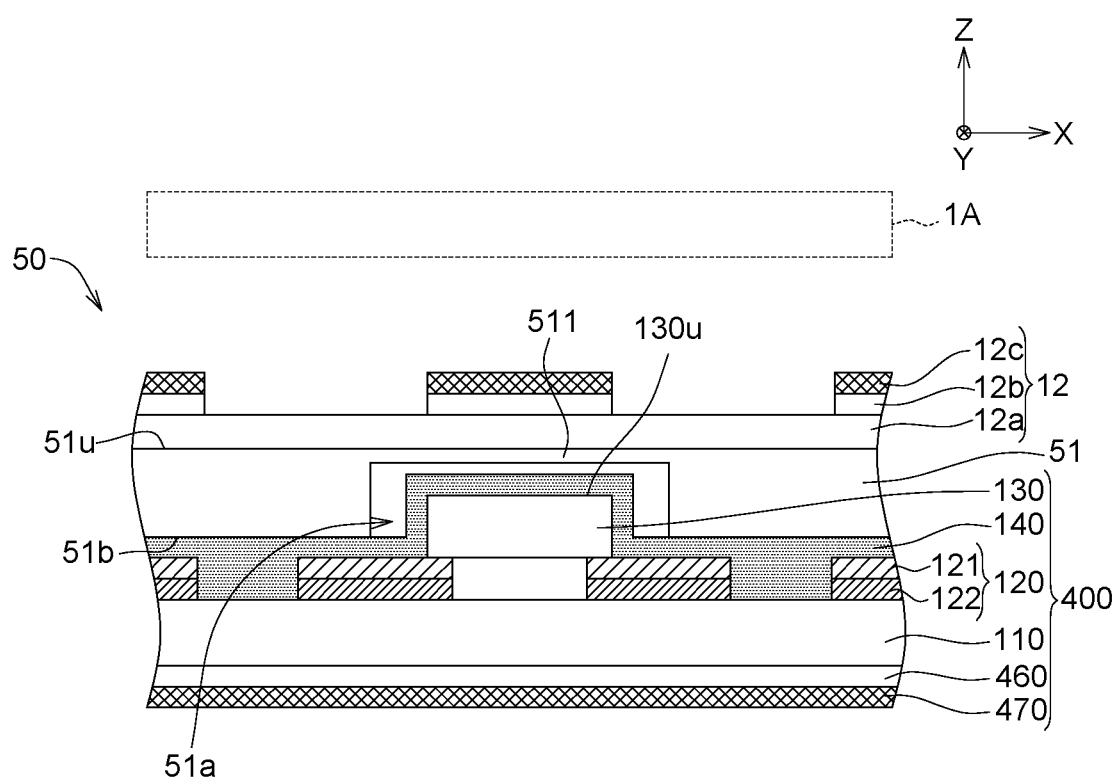
FIG. 14 illustrates a partial cross-sectional view of a backlight module 50 according to another embodiment of the present invention.

Referring to FIG. 14, a partial cross-sectional view of a backlight module 50 according to another embodiment of the present invention is illustrated. The backlight module 50 includes a light guide plate 51, the circuit structure 400 and the protection sheet 12. The backlight module 50 of the embodiment of the present invention has the same or similar technical features as the backlight module 10 described above, and the difference is that the structure of the light guide plate 51 of the backlight module 50 is different from the light guide plate 11 of the backlight module 10.

The light guide plate 51 has a light-exit surface 51*u* and an opposite surface 51*b* opposed to the light-exit surface 51*u*. The light guide plate 51 has at least one opening 51*a*, and the opening 51*a* could accommodate the electronic component 130. In the present embodiment, the opening 51*a* extends toward the light-exit surface 51*u* from the opposite surface 51*b*, but does not extend to the light-exit surface 51*u*. In other words, the opening 51*a* is a blind hole. Due to the opening 51a being the blind hole, the light guide plate 51 retains a light-transmissive portion 511 corresponding to the light-emitting surface 130u of the electronic component 130, and thus it could increase light transmission efficiency, reduce light loss and/or increase light output brightness. In addition, any one of the light guide plate 11 of the backlight module 20 of FIG. 11B, the light guide plate 11 of the backlight module 30 of FIG. 12, and the light guide plate 11 of the backlight module 40 of FIG. 13 could also be replaced by the light guide plate 51.

Figure 15:
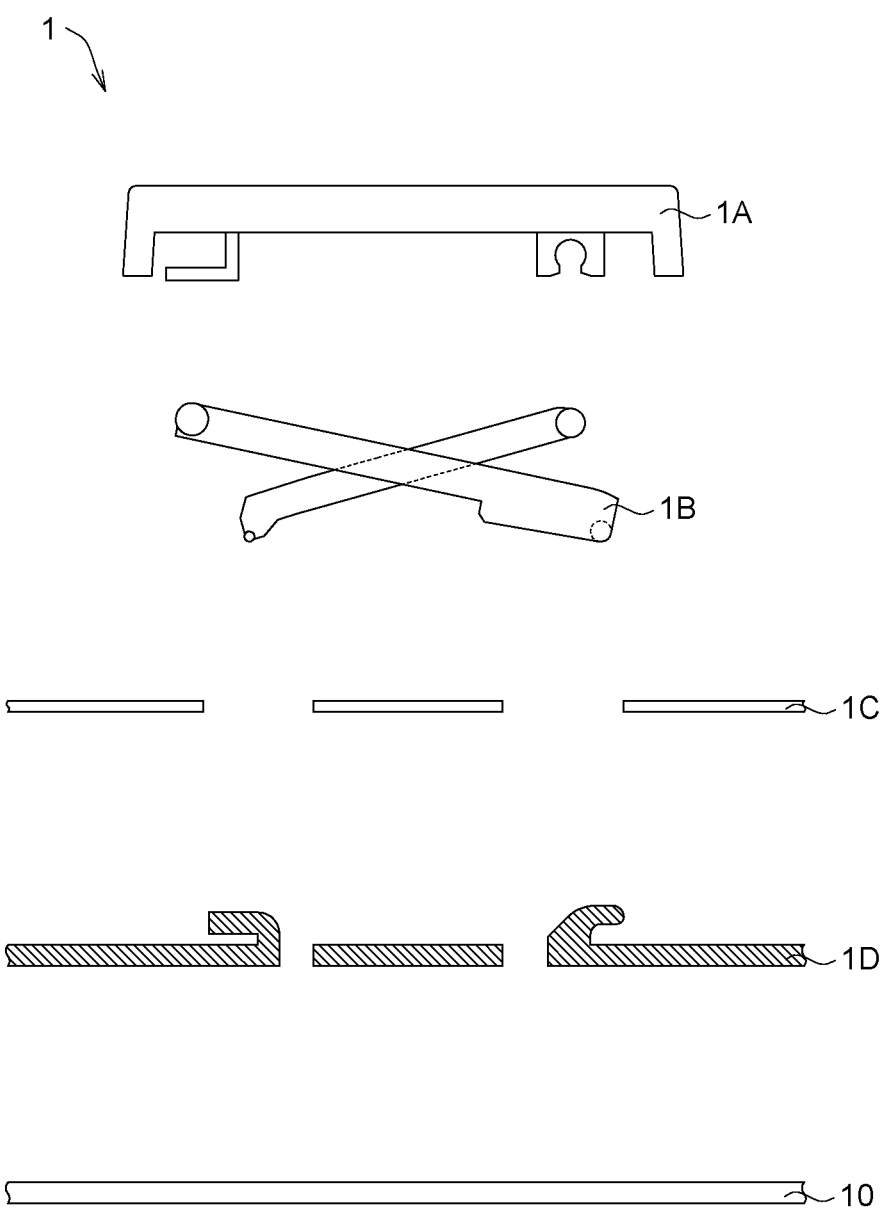
FIG. 15 illustrates an exploded view of the light-emitting key device 1 according to an embodiment of the present invention.

Referring to FIG. 15, an exploded view of the light-emitting key device 1 according to an embodiment of the present invention is illustrated. The light-emitting key device 1 is, for example, a light-emitting keyboard with at least one key. The light-emitting key device 1 includes at least the backlight module 10, at least one keycap 1A, at least one lifting mechanism 1B, a membrane switch layer 1C and a bottom plate 1D, wherein the lifting mechanism 1B is disposed between the keycap 1A and the bottom plate 1D and pivotally connects the keycap 1A with the bottom plate 1D to driving the keycap 1A to move up and down relative to the bottom plate 1D. The membrane switch layer 1C and the backlight module 10 could be disposed on two opposite sides of the bottom plate 1D.

In the present embodiment, one keycap 1A and one lifting mechanism 1B constitute one key. The backlight module 10 could emit light toward the keycap 1A of the key, and the light is emitted from periphery of the keycap 1A and/or from light-transmissive area (for example, a character area or a symbol area) of the keycap 1A. When the keycap 1A is pressed to be triggered, a processor (not illustrated) electrically connected with the backlight module 10 could control the electronic component 130 corresponding to the keycap 1A to emit light. In an embodiment, each key corresponds to at least one electronic component 130 (not illustrated in FIG. 14) of the backlight module 10. As a result, light emitted from each key of the light-emitting key device 1 could be more uniformly and/or more bright.

In another embodiment, the backlight module 10 of the light-emitting key device 1 could be replaced by any one of the backlight modules 20, 30, and 40.

In addition, in each of the aforementioned circuit structures or backlight modules, the reflective layer and the light-shielding layer in combination with the light-transmissive insulation layer (for example, component 110 or 12a) have a variety of relative arrangements. For example, (1). The reflective layer and the light-shielding layer could be disposed on the same side of the light-transmissive insulation layer, for example, both on the first insulation surface or the second insulation surface of the light-transmissive insulation layer; or (2). the reflective layer and the light-shielding layer could be disposed on two opposite sides of the light-transmissive insulation layer, for example, the reflective layer and the light-shielding layer are disposed on the first insulation surface and the second insulation surface of the light-transmissive insulation layer, or disposed on the second insulation surface and the first insulation surface of the light-transmissive insulation layer.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A circuit structure, comprises:
a light-transmissive insulation layer;
a patterned conductive layer disposed on the light-transmissive insulation layer; and
an electronic component disposed on the patterned conductive layer and electrically connected to the patterned conductive layer;
wherein the patterned conductive layer comprises:
a first sub-conductive layer; and
a second sub-conductive layer formed between the first sub-conductive layer and the light-transmissive insulation layer;
wherein conductivity of the first sub-conductive layer is higher than that of the second sub-conductive layer.

2. The circuit structure as claimed in claim 1, wherein the circuit structure further comprises:
a protection layer covering the electronic component.

3. The circuit structure as claimed in claim 2, wherein the electronic component has a light-emitting surface, the protection layer has a first protection surface and a second protection surface, the first protection surface and the light-emitting surface overlap along an optical axis direction of the electronic component, the second protection surface and the first protection surface are staggered with each other along an extension direction that is perpendicular to the optical axis direction, and the second protection surface and the first protection surface are staggered with each other along the optical axis direction.

4. A backlight module, comprises:
a light guide plate having a light-exit surface and an opposite surface opposite to the light-exit surface;
a circuit structure comprising:
a light-transmissive insulation layer;
a patterned conductive layer disposed on the light-transmissive insulation layer; and
an electronic component disposed on the patterned conductive layer and electrically connected to the patterned conductive layer, wherein the electronic component is a light-emitting component; and
a protection sheet;
wherein the circuit structure is disposed on one of the light-exit surface and the opposite surface, and the protection sheet is disposed on another of the light-exit surface and the opposite surface;
wherein the patterned conductive layer comprises:
a first sub-conductive layer; and
a second sub-conductive layer formed between the first sub-conductive layer and the light-transmissive insulation layer;
wherein conductivity of the first sub-conductive layer is higher than that of the second sub-conductive layer.

5. The backlight module as claimed in claim 4, wherein the light-emitting surface of the electronic component of the circuit structure faces the protection sheet.

6. The backlight module as claimed in claim 5, wherein the light-emitting surface faces an insulation surface of a light-transmitting insulation layer of the protection sheet.

7. The backlight module as claimed in claim 4, wherein the light-emitting surface of the electronic component of the circuit structure faces the light-exit surface or the opposite surface.

8. The backlight module as claimed in claim 4, wherein the protection sheet comprises:
a light-transmissive insulation layer;
a reflective layer disposed on the light-transmissive insulation layer; and a light-shielding layer disposed on the reflective layer;
wherein the reflective layer comprises a first reflective portion and a second reflective portion, the first reflective portion surrounds a first light-transmissive region, the second reflective part is located within the first light-transmissive region and position of the second reflective part corresponds to the electronic component; the light-shielding layer comprises a first light-shielding portion and a second light-shielding portion, the first light-shielding portion surrounds a second light-transmissive region, the second light-shielding portion is located within the second light-transmissive region, and position of the second light-shielding portion corresponds to the electronic component.

9. The backlight module as claimed in claim 4, wherein the protection sheet comprises:
a light-transmissive insulation layer;
a reflective layer disposed on the light-transmissive insulation layer; and
a light-shielding layer disposed on the reflective layer;
wherein the reflective layer comprises a first reflective portion, the first reflective portion surrounds a first light-transmissive region, position of the first reflective portion corresponds to the electronic component, and the light-shielding layer comprises a first light-shielding portion, the first The light-shielding portion surrounds a second light-transmissive region, and position of the first light-shielding portion corresponds to the electronic component.

10. The backlight module as claimed in claim 8, wherein the first light-transmissive region and the second light-transmissive region define a key arrangement area of a keyboard.

11. A light-emitting key device, comprises:
a backlight module, comprises:
a light guide plate having a light-exit surface and an opposite surface opposite to the light-exit surface;
a circuit structure comprising:
a light-transmissive insulation layer;
a patterned conductive layer disposed on the light-transmissive insulation layer; and
an electronic component disposed on the patterned conductive layer and electrically connected to the patterned conductive layer, wherein the electronic component is a light-emitting component; and
a protection sheet;
wherein the circuit structure is disposed on one of the light-exit surface and the opposite surface, and the protection sheet is disposed on another of the light-exit surface and the opposite surface;
wherein the light-emitting key device further comprises:
a keycap; and
a lifting mechanism disposed between the backlight module and the keycap;
wherein the patterned conductive layer comprises:
a first sub-conductive layer; and
a second sub-conductive layer formed between the first sub-conductive layer and the light-transmissive insulation layer;
wherein conductivity of the first sub-conductive layer is higher than that of the second sub-conductive layer.

* * * * *